US009716674B2

(12) United States Patent
Ciofalo et al.

(10) Patent No.: US 9,716,674 B2
(45) Date of Patent: Jul. 25, 2017

(54) SYSTEMS AND METHODS FOR VIRTUAL INTERACTION

(71) Applicant: FVMC Software LLC, Moorpark, CA (US)

(72) Inventors: Marco Ciofalo, Florence (IT); Fabio Viviani, Moorpark, CA (US)

(73) Assignee: FVMC Software, LLC, South Barrington, IL (US)

( * ) Notice: Subject to any disclaimer, the term of this patent is extended or adjusted under 35 U.S.C. 154(b) by 90 days.

(21) Appl. No.: 14/466,520

(22) Filed: Aug. 22, 2014

(65) Prior Publication Data

US 2016/0057083 A1   Feb. 25, 2016

(51) Int. Cl.

| G06F 15/16 | (2006.01) |
| H04L 12/58 | (2006.01) |
| H04N 7/14 | (2006.01) |
| G06F 3/01 | (2006.01) |
| G06F 17/30 | (2006.01) |

(52) U.S. Cl.
CPC ............... H04L 51/02 (2013.01); G06F 3/01 (2013.01); G06F 17/30654 (2013.01); H04L 51/32 (2013.01); H04N 7/141 (2013.01)

(58) Field of Classification Search
CPC .......... H04L 51/02; H04L 51/32; H04N 7/141
USPC ........................................................ 709/206
See application file for complete search history.

(56) References Cited

U.S. PATENT DOCUMENTS

| 6,144,938 A * | 11/2000 | Surace ................ G10L 13/033 704/257 |
| 6,800,031 B2 | 10/2004 | Di Cesare |
| 7,284,202 B1 | 10/2007 | Zenith |
| 9,318,113 B2 | 4/2016 | Westby et al. |
| 2002/0010584 A1 * | 1/2002 | Schultz ................... G06F 3/16 704/270 |
| 2006/0155765 A1 * | 7/2006 | Takeuchi .......... G06F 17/30654 |
| 2009/0112680 A1 | 4/2009 | Dovrath et al. |
| 2012/0140904 A1 | 6/2012 | Li et al. |

(Continued)

FOREIGN PATENT DOCUMENTS

EP         1772854 A1 *  4/2007  ....... G06F 17/30401

OTHER PUBLICATIONS

International Search Report and Written Opinion for Application No. PCT/US2015/046096 dated Oct. 29, 2015.

*Primary Examiner* — Glenford Madamba
(74) *Attorney, Agent, or Firm* — Lerner, David, Littenberg, Krumholz & Mentlik, LLP (57) ABSTRACT

In one aspect, at least one processor may receive a first user input and identify one or more first keywords from the first user input to determine one or more previously recorded outputs corresponding to the first keywords. The previously recorded outputs may correspond to a virtual character, such as a celebrity. Further, the at least one processor may select one of the determined previously recorded outputs and output the selected previously recorded output corresponding to the virtual character. The at least one processor may also identify one or more second keywords from at least the first user input, temporarily store the second keywords in memory in association with at least one portion of the user input, receive a second user input, and determine another previously recorded output based at least in part on the temporarily stored keywords associated with the first user input.

20 Claims, 7 Drawing Sheets

(56) References Cited

U.S. PATENT DOCUMENTS

| | | | |
|---|---|---|---|
| 2013/0018895 A1* | 1/2013 | Harless | G10L 15/1822 707/748 |
| 2013/0110520 A1* | 5/2013 | Cheyer | G06F 17/3087 704/275 |
| 2014/0013230 A1 | 1/2014 | Malone | |
| 2014/0036022 A1 | 2/2014 | Croen et al. | |

\* cited by examiner

SYSTEMS AND METHODS FOR VIRTUAL INTERACTION

BACKGROUND OF THE INVENTION

The interaction between celebrities and fans may include various forms of communication, such as face-to-face encounters or meetings, fan mail, social media, electronic mail and the like. However, celebrities may generally find it difficult to interact with fans due to their busy schedules, the impracticable task of responding to every single communication they receive within a reasonable amount of time, or other reasons. In a similar regard, the fans may find the process and experience of interacting with celebrities equally challenging and frustrating.

SUMMARY OF THE INVENTION

One aspect of the disclosure provides a method that comprises receiving, using at least one processor, a first user input and identifying, using the at least one processor, one or more first keywords from the first user input in order to determine one or more previously recorded outputs corresponding to the one or more first keywords. The previously recorded outputs may correspond to a virtual character, such as a celebrity. Further, the method comprises selecting, using the at least one processor, one of the determined previously recorded outputs, and outputting the selected previously recorded output corresponding to the virtual character. Moreover, the method further comprises identifying, using the at least one processor, one or more second keywords from at least the first user input, temporarily storing the one or more second keywords in association with at least one portion of the user input, receiving a second user input, and determining, using the at least one processor, another previously recorded output based at least in part on the temporarily stored keywords associated with the first user input.

Another aspect of the disclosure provides a system comprising a memory and at least one processor coupled to the memory. The at least one processor is configured to receive a first user input and identify one or more first keywords from the first user input to determine one or more previously recorded outputs corresponding to the one or more first keywords. The previously recorded outputs correspond to a virtual character, such as a celebrity. Further, the at least one processor is configured to select one of the determined previously recorded outputs and output the selected previously recorded output corresponding to the virtual character. Moreover, the at least one processor is configured to identify one or more second keywords from at least the first user input, temporarily store the one or more second keywords in memory in association with at least one portion of the first user input, receive a second user input, and determine another previously recorded output based at least in part on the temporarily stored keywords associated with the first user input.

A further aspect of the disclosure provides a non-transitory, tangible computer-readable medium on which instructions are stored, the instructions when executed by at least one processor performs a method, the method comprising receiving a first user input and identifying one or more first keywords from the first user input in order to determine one or more previously recorded outputs corresponding to the one or more first keywords. The previously recorded outputs may correspond to a virtual character, such as a celebrity. Further, the method comprises selecting one of the determined previously recorded outputs, and outputting the selected previously recorded output corresponding to the virtual character. Moreover, the method further comprises identifying one or more second keywords from at least the first user input, temporarily storing the one or more second keywords in association with at least one portion of the user input, receiving a second user input, and determining another previously recorded output based at least in part on the temporarily stored keywords associated with the first user input.

DETAILED DESCRIPTION

The present disclosure is directed to interacting with a virtual character. For example, the virtual character may be any celebrity, such as a celebrity chef, an actor, an actress, an athlete, a politician, a comedian, an animated character, a historical figure, a virtual speaker, a mascot, a brand, a business, etc. In one instance, a user may request an interactive session with the celebrity using a computing device. The user may interact with the celebrity using various inputs, e.g., a natural language speech input, text input, etc. Based on the input, the computing device may provide a video, an audio and/or a text response from the celebrity. During the interactive session, various keywords may be stored in a memory device for subsequent use throughout the session. In another instance, the user may interact with two or more celebrities, and the two or more celebrities may interact with each other during the same session.

In one aspect, a user may interact with a virtual character via natural language speech. In that regard, the user may be able to communicate and interact with the celebrity in a conversational manner. For example, the user may ask a celebrity: "I like your books. How many books have you written in total?" Subsequently, the computing device may perform analysis on the speech input and associate the input with an appropriate response. In this example, the response may be a prerecorded video of the actual celebrity answering the user's question: "I've written a total of four books and working on my fifth." The video may be accompanied by audio and/or displayable text.

In another aspect, a user may interact with a virtual character via written text. The user may use an input component of a computing device to communicate with the celebrity using written words. For instance, the input component may be a keyboard, or an input interface of a mobile computing device, e.g., smartphone, tablet, etc. Similar to the example above, the user may ask a celebrity a question about the number of books the celebrity has written by inputting the question as text. In response, the computing device may provide a video, an audio, and/or a text response to the user.

The responses to user input may be previously recorded by a virtual character, such as a celebrity, and stored in a memory device. For example, a celebrity, in person, may record various answers to questions that a user may likely ask. The recorded answers may be in the form of video, audio, text, etc. These answers may also be stored in a memory device, and each of the answers may be associated with a type of question, or alternatively, may be associated with a specific question. The answers may be continually updated based on various factors, e.g., the answer is no longer relevant, etc. If an answer cannot be associated with the question, then the computing device may prompt the user to either clarify or ask the question in a different manner.

In another aspect, various keywords during the course of an interactive session between a user and a virtual character may also be identified and stored in at least one memory. For instance, the keywords may be certain pronouns associated with certain nouns. In this regard, when the user uses a pronoun to refer to a noun (rather than the noun itself), the computing device may recognize the user's reference to the noun in order to maintain the conversational interaction and consistency between the user and the celebrity.

In yet another aspect, a user may virtually interact with more than one virtual character during the same session, e.g., multiple celebrities, multiple athletes, multiple politicians, etc. For example, the user may initiate an interactive session with three different athletes. The three athletes may be associated with one particular sports team. Thus, the user may not only interact with all three athletes, but the athletes may interact among themselves.

The above-described features allow a user to virtually interact with one or more virtual characters in a conversational manner, as if the user is actually speaking to the celebrity in person. In that regard, the user's interaction with the one or more celebrities.

Figure 1:
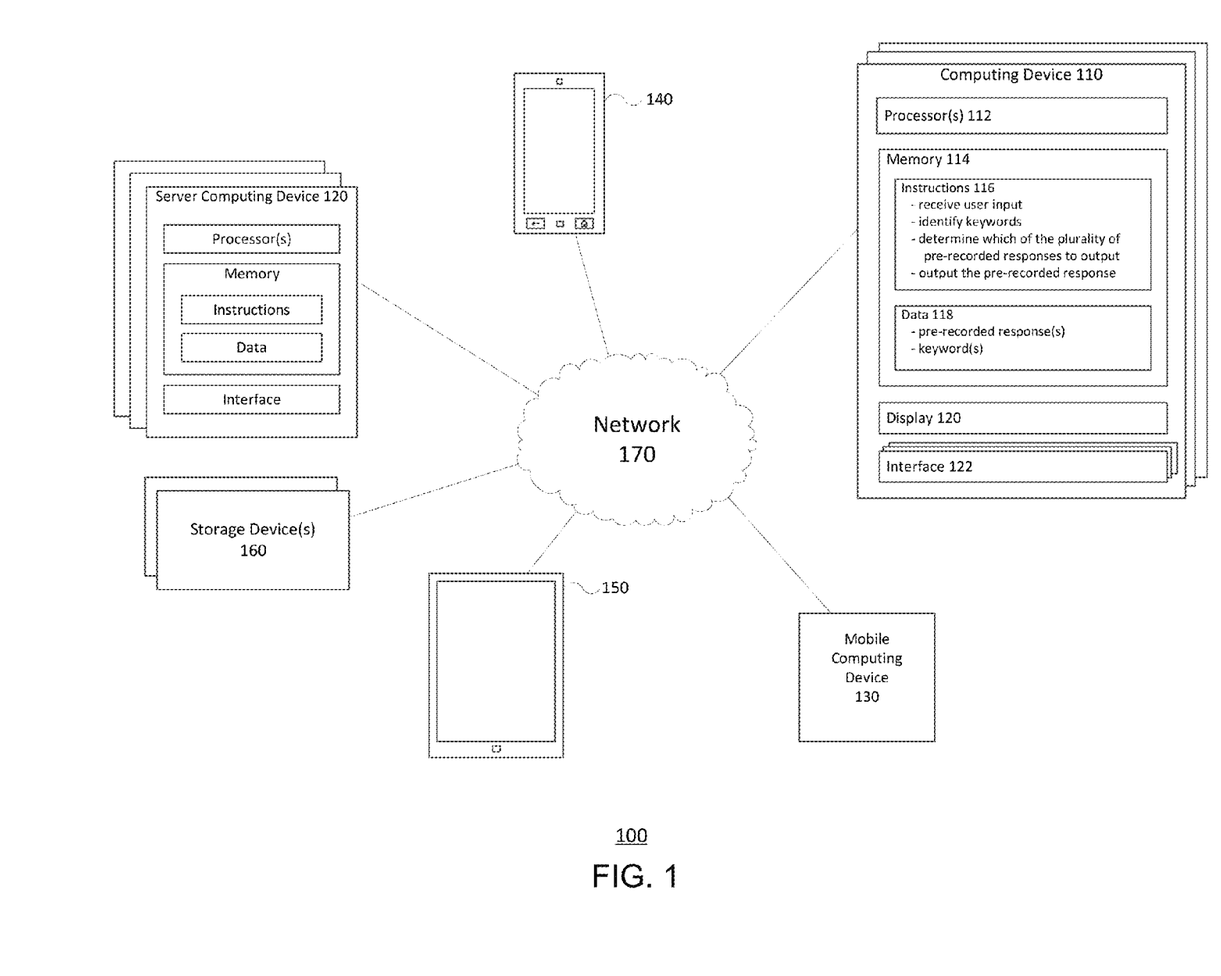
FIG. 1 is a system diagram in accordance with aspects of the disclosure.

FIG. 1 illustrates an example system 100 in accordance with aspects of the disclosure. The system 100 may include a plurality of computing devices, e.g., computing device(s) 110, server computing device 120, mobile computing device 130, smartphone 140, tablet computing device 150, and storage device 160 connected to network 170. For example, the computing device 110 may be a desktop computer intended for use by a user and include a plurality of components associated with a desktop computer, such as one or more processors 112, memory 114, display 120, and interface 122. In another example, the mobile computing device 130 may be a laptop and also include components similar to the computing device 110. The server computing device 120 may also include at least one or more processors, memory, and an interface and may be configured to communicate with at least one of the computing device 110, the mobile computing device 130, the smartphone 140, the tablet computing device 150 and the storage device 160. As shown by the cascaded blocks, there may be more than one of each device connected to the network 170.

Processor 112 may instruct the components of computing device 110 to perform tasks based on the processing of various types of information, such as instructions 116 and/or data 118 stored in the memory 114. The processor 112 may be hardware that performs one or more operations, e.g., adding, subtracting, comparing numbers, jumping from one program to a second program, input/output operations, etc. By way of example only, one or more control units (not shown) coupled to an arithmetic logic unit (ALU) (not shown) and memory 114 may direct the computing device 110 to carry out program instructions 116 stored in memory 114 at a particular clock rate. The processor 112 may be any standard processor, such as a central processing unit (CPU), or may be a dedicated processor, such as an application-specific integrated circuit (ASIC) or a field programmable gate array (FPGA). While one processor block is shown, the computing device 110 may also include multiple processors coupled in parallel.

Memory 114 stores information accessible by processor 112 including instructions 116 for execution by the processor 112 and data 118 which is retrieved, manipulated or stored by the processor 112. The memory 114 may be of any type capable of storing information accessible by the processor, such as a hard-drive, ROM, RAM, CD-ROM, write-capable, read-only, or the like.

The instructions 116 may include any set of instructions to be executed directly (such as machine code) or indirectly (such as scripts) by the processor 112. In that regard, the terms "instructions," "steps" and "programs" may be used interchangeably herein.

By way of example only, the instructions 116 may include at least a set of executable instructions to virtually interact with a celebrity, such as a celebrity, and a set of instructions to perform analysis on user input, e.g., natural language speech, text, etc. For instance, a set of instructions that perform analysis on user input may include speech recognition instructions. As will be further discussed in the examples below, when a user requests to interact with the celebrity, the executable instructions may allow the processor 112 and other hardware components of computing devices 110 to receive the user input, perform analysis thereon, and associate one or more celebrity responses to the user input.

Data 118 may be retrieved, stored or modified by processor 112 in accordance with the instructions 116. The data 118 may be stored as a collection of data. For instance, although the invention is not limited by any particular data structure, the data 118 may be stored in computer registers, in a relational database as a table having a plurality of different fields and records, such as an XML. The data 118 may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

As an example, the data 118 may include video, audio, text, and other types of recorded responses of characters, such as real-life celebrities, answering various questions that a user may likely ask. In one instance, a video file (which may be compressed) of a celebrity reciting, "I have two dogs and three cats," may be stored as data 118 in memory 114, which may be associated with a questions such as, "How many pets do you have?" The data 118 may include numerous responses and these responses are not limited to video, audio, or text. The responses may include any type of data that is capable of being retrieved, stored or modified by one or more processors of any computing device.

The display 120 may be any type of device capable of communicating data to a user. For example, the display 120 may be a liquid-crystal display (LCD) screen, a plasma screen, etc. The display 270 may provide various types of information to the user, such as visual representations of celebrities (e.g., video, images), audio, text outputs, etc.

Interface 122 may be a device, port, or a connection that allows a user to communicate with computing device 110. For instance, the interface 122 may include, for example, a keyboard, a mouse, touch-sensitive screen, microphone, camera, etc. The interface 122 may also include one or more input/output ports. The input/output ports may include any type of data port, such as a universal serial bus (USB) drive, CD/DVD drive, zip drive, SD/MMC card reader, etc., and may be compatible with any type of user interface.

According to one aspect, a user may input information and/or data using the interface 122. Subsequently, the computing device 110 may receive and process the information to provide the user with an interactive experience with one or more celebrities. For example, the user may ask a celebrity a question via at least a camera and a microphone. The processor 112 may analyze the natural language speech input to identify keywords so that an appropriate output response can be determined. In another example, the user may also input information and/or data via an interactive interface by, for example, entering text into a text box, or selecting pre-formulated questions to ask the celebrity (as will be further discussed below).

Similar to the computing device 110, the server computing device 120 may also include at least one or more processors, memory, and an interface. The server computing device 120 may be rack mounted on a network equipment rack and/or located in a data center. Using the network 170, the server computing device 120 may serve the requests of programs executed on computing device 110, mobile computing device 130, smartphone 140, tablet computing device 150, and storage device 160.

Mobile devices, such as mobile computing device 130, smartphone 140, and tablet computing device 150, may have similar components and function to the computing device 110, e.g., processor, memory, input/output capabilities, etc.

For example, the mobile computing device 130 may be any type of device with computing capability and connectivity to a network. For example, the mobile computing device 130 may be a laptop, smartphone, PDA, tablet computer, etc. The mobile computing device 130 may also have one or more processors, memory, user interfaces, network connection hardware, and other types of components associated with a mobile computing device. In that regard, the mobile computing device may be able to connect to network 170 via a wired or a wireless connection and communicate with other components connected to the network 170.

The smartphone 140 may be a mobile phone with computing capability and network connectivity. For example, the smartphone 40 may include one or more processors, memory, user interfaces, a camera, image sensors, a global positioning system (GPS), accelerator, temperature sensors, etc. Similar to the computing device 110, the smartphone 140 may be configured to execute computer instructions, applications, programs, and the like. In one instance, a user using the smartphone 140 may be able to download via network 170 an application, such as an application to have an interactive session with a celebrity.

The tablet computing device 150 may include all components typically present on a tablet computer including a touchscreen display, sensors, microphone, camera, speakers, etc. For example, the tablet computer may execute computer instructions, applications, or programs using at least one of one or more processors, memory, and other processing hardware. The tablet computing device may also be configured to connect to a network, such as network 170, via network connection hardware.

The storage device 160 may be a component configured to store a large quantity of data. For example, the storage device 160 may be a collection of same or different storage components, or a mixed collection of storage components, such as ROM, RAM, hard-drives, solid-state drives, removable drives, network storage, virtual memory, multi-leveled cache, registers, etc. In addition, the storage device 160 may be configured so that it can be accessed by at least the server computing device 120 to provide data to various components connected to the network 170.

By way of example only, the storage device 160 may store the above-described video, audio, text, as well as other types of previously recorded (or pre-recorded) responses of real-life celebrities answering various questions that a fan may likely ask. In this regard, the computing device 110 may provide in some instances the video responses, audio responses, text responses, and other types of responses to the computing device 110 via network 170. In another example, the storage device 160 may be updated, for example, to add new data (e.g., new video responses, new audio responses, new text responses, etc.) based on the numerous interactive interactions and user inputs detected and analyzed over time. For example, if the user asks a question for which an appropriate response is identified by at least the computing device 110 or server computing device 120, the computing device 110 or the server computing device 120 may store and flag this question when new pre-recorded responses for the question is provided, stored, and updated.

In addition, the storage device 160 may store various keywords that may be used during the course of an interactive session between a celebrity and a user. For instance, the keywords may be one or more pronouns associated with nouns that may be used by the user. The one or more pronouns may be "I," "you," "he," "she," "it," "that," etc. In this regard, when the user uses a particular keyword, e.g., a pronoun, to refer to an associated noun, a computing device (e.g., the computing device 110, server computing device 120) may recognize the user's reference to the associated noun in order to maintain the conversational interaction and consistency between the user and the celebrity. For example, a user may ask a celebrity, "Didn't you recently take a trip to France?" The keywords associated with "a trip" or "France" may be a pronoun, "it," or "that." These keywords and associated nouns (or any portion of the user input) may be temporarily stored in cache to be later identified in subsequent questions and conversations. As such, when the user subsequently asks the celebrity "How was it?" the computing device 110, for example, identifies the term "it" to mean the "trip" or "France." It should be understood that the keywords may include be any part of speech that can be associated with one or more portions of the user input.

The network 170 may be any type of network, wired or wireless, configured to facilitate the communication and transmission of data, instructions, etc. from one network component to a second network component. For example, the network 170 may be a local area network (LAN) based on at least Ethernet or other IEEE 802.03 LAN technologies, Wi-Fi based on at least IEEE 802.11 standards, wide area network (WAN), virtual private network (VPN), global area network (GAN), or any combination thereof. As such, the computing device 110, mobile computing device 130, smartphone 140, and/or tablet computing device 150 may connect to and communicate with the server computing device 120 via the network 170.

While the computing device 110 may be a desktop computer in the above-described examples, any of the computing devices shown in FIG. 1 may be any device capable of processing instructions and transmitting data to and from humans, including wireless phones, personal digital assistants (PDAs), laptop computers, Bluetooth headsets, wearable computing devices, etc.

Further, although the processor 112, memory 114, display 120 and interface 122 are functionally illustrated in FIG. 1 within the same block, it will be understood by those of ordinary skill in the art that the processor 112, memory 114, display 120 or interface 122 may actually comprise multiple processors, memories, displays or interfaces that may or may not be stored within the same physical housing. For example, some or all of the instructions 116 and data 118 may be stored on removable CD-ROM and others within a read-only computer chip, or may be stored in a location physically remote from, yet still accessible by, the processor 112. Similarly, as noted above, the processor 112 may actually comprise a collection of processors which may or may not operate in parallel.

Further to the system and operations thereof described above and illustrated in FIG. 1, various operations will now be described below. The following operations are not required to be performed in a particular or precise order. Rather, the various steps may be performed in a different order, different combinations, or simultaneously, and one or more steps may also be added or omitted.

Figure 2:
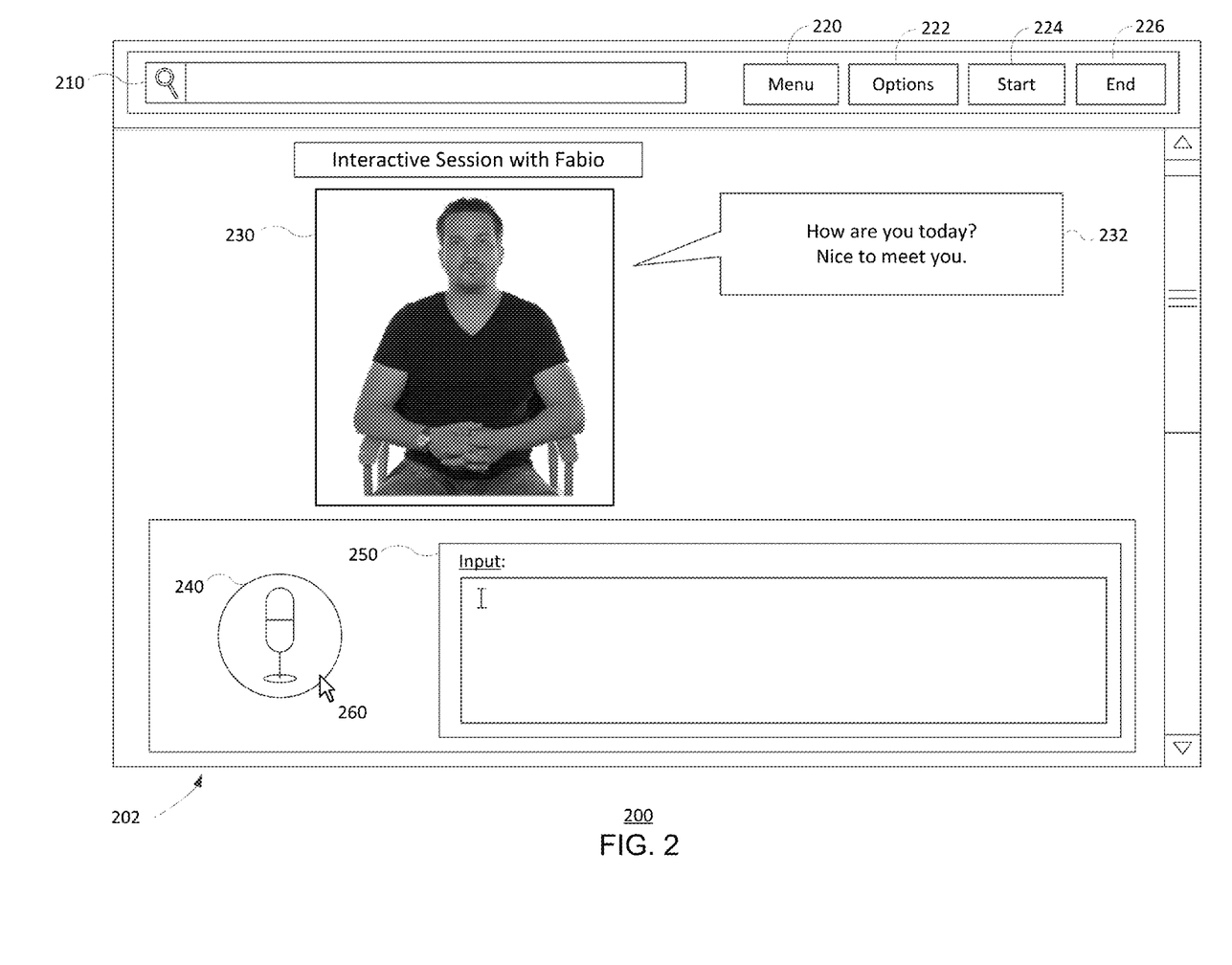
FIG. 2 is an example screenshot of an interactive interface in accordance with aspects of the disclosure.

FIG. 2 is an example screenshot 200 of an interactive interface 202 in accordance with aspects of the disclosure. For example, a user may want to virtually interact with a virtual character. As noted above, the virtual character may be any celebrity, sports figure, historical figure, animated character, mascot, a business, a brand, a tour guide, etc. Here, the virtual character may be celebrity chef, Fabio Viviani. Initially, the user may start a new interactive session with the celebrity by opening up an interactive interface, via a graphical user interface (GUI) or a web browser interface associated with the new interactive session, on a computing device, e.g., computing device 110, mobile computing device 130, smartphone 140, or tablet computing device 150.

By way of the example screenshot 200 depicted in FIG. 2 only, the interactive interface 202 includes a search field 210, a menu 220, options 222, start 224, and end 226. When the user initiates to interact with at least one celebrity to interact, an image, video, or other visual representations of the celebrity may be rendered to the user in box 230. A dialogue box 232 (which may be accompanied by audio) may also be rendered to the user. In order to interact with the celebrity, the user may use natural language speech input 240 or text input 250.

In one aspect, a user may open the interactive interface 202 on a computing device. Subsequently, the user may search for a celebrity in the search field 210 using one or more search terms, such as "interactive session with Fabio Viviani," "Fabio Viviani," "Fabio chef," etc. The one or more processors of the computing device may perform the association between the search terms and the correct celebrity data, which may be stored in the computing device's memory or a storage device connected to the computing device within the same network. Once the user selects the celebrity, an interactive session between the user and the celebrity may be initiated.

In the above-instance, the one or more processors of the computing device may render a visual representation of Fabio Viviani, himself, to the user in box 230. As described above, this visual representation may be a previously recorded video, an image, an animation, a generally three-dimensional representation, a hologram, a simulation, etc.

As an example, a recorded video of Fabio Viviani may initially greet the user with "How are you today? Nice to meet you." in the dialogue box 232, which may also be rendered to the user. The greeting may be different for every interactive session. In an alternative instance, the user may be the first to initiate the interactive session. In this instance, the user may input, "How are you today? Nice to meet you." The celebrity may then respond to the user's input. The visual representation of Fabio Viviani in box 230 may continue to move while the user asks questions to give an appearance of real-time, live conversation (as opposed to the series of outputted video responses freezing between questions). For example, the visual effect of the continuing movement may be provided by stitching video clips of non-verbal movement between the pre-recorded video responses, and looping the video clips of non-vernal movement as needed to fill a time between outputting a first response and outputting a second response. Non-verbal movements may include, for example, blinking, stretching, turning head, readjusting position, stroking hair, twiddling thumbs, or the like.

The user may interact with the celebrity using different types of inputs. For example, the user may respond to Fabio Viviani's greeting using either the natural language speech input 240 or the text input 250, or both, provided by the interactive interface 202. As shown, the user may drag a cursor 260 over to the microphone icon to enter the natural language speech input 240. Alternatively, if the interactive interface 202 is configured to accommodate touch via a touchscreen display, the user may touch the microphone icon to input natural language speech via a microphone coupled to the computing device. The user may also enter text input 250 via the depicted textbox via a keyboard, a keyboard interface, or a similar user input device. In that regard, the user may respond, "I'm doing well. How are you? Is it true that you do a lot of traveling in Europe?" by either speaking or typing it using various input interfaces. As will be further described below, the one or more processors of the computing device may perform analysis on the user input to associate, for instance, a previously recorded video response to the input. Alternatively, the analysis may be performed by the server computing devices 120, or any other computing device capable of performing such analysis.

While FIG. 2 depicts an interactive interface in a particular configuration, the layout of the interface is not limited thereto. For example, there may be more or fewer input fields on the interface. In another example, the entire conversation during the interactive session may be displayed as text and/or rendered as audio via the interface.

In another aspect, the user may be provided with a set of previously formulated inputs that the user may select during the interactive experience.

Figure 3:
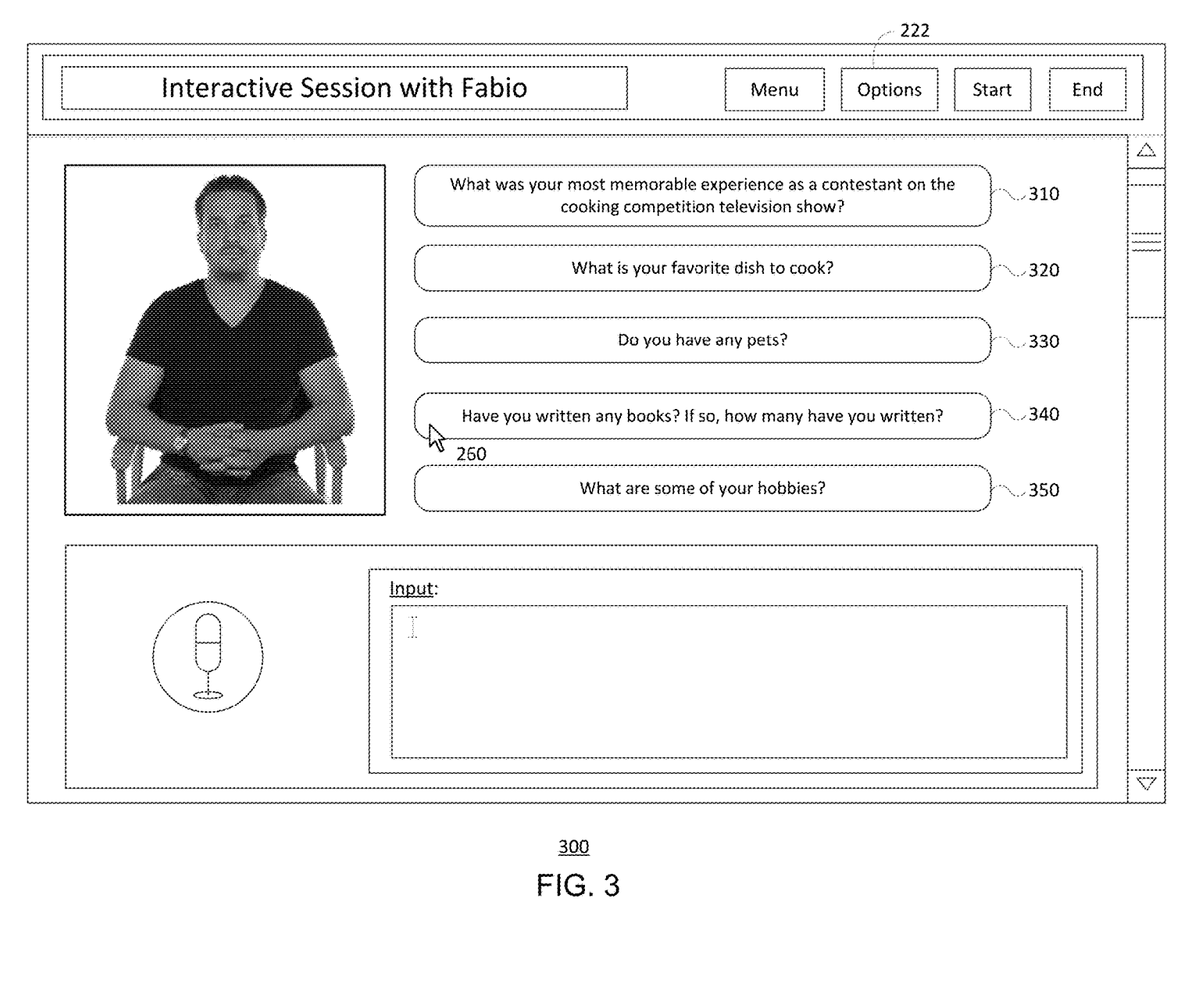
FIG. 3 is another example screenshot of an interactive interface in accordance with aspects of the disclosure.

FIG. 3 is another example screenshot 300 of the interactive interface 202. In addition to providing the user with options to enter a natural language speech input or text input, the interactive interface 202 may also provide pre-formulated inputs for the user to select. In one example, the user may press the options 222 icon on the interactive interface 202 to access the pre-formulated inputs. In other examples, these pre-formulated inputs may be automatically rendered to the user at the beginning of the interactive session. These inputs may be unique to each celebrity, or may also be more generalized to a certain subject.

As depicted, the one or more processors of the computing device may render one or more pre-formulated inputs 310, 320, 330, 340, 350 selectable by the user. By way of example only, the pre-formulated input 310 recites, "What was your most memorable experience as a contestant on the cooking competition television show?" The pre-formulated input 320 states, "What is your favorite dish to cook?" Further, the pre-formulated input 330 asks, "Do you have any pets?" In a similar manner, the pre-formulated input 340 recites, "Have you written any books? If so, how many have you written?" The pre-formulated input 350 asks, "What are some of your hobbies?" More or less of these formulated inputs may be rendered to the user for the user to select as part of the interactive experience. At any point during the interactive session, the user may also revert to natural language speech input or text input, or may use at least all three forms of input during the course of the session.

The user may select the pre-formulated input 340 to ask, Fabio Viviani, whether he has written any books, and if so, how many books he has written. As such, the one or more processors of the computing device may associate an output to the input 340, such as a video response of Fabio Viviani answering "I've written a total of four books and working on my fifth," which may be stored in at least the memory of the computing device or a storage device communicating with the computing device via a network. The response may be accompanied by audio and/or displayable text.

Figure 4:
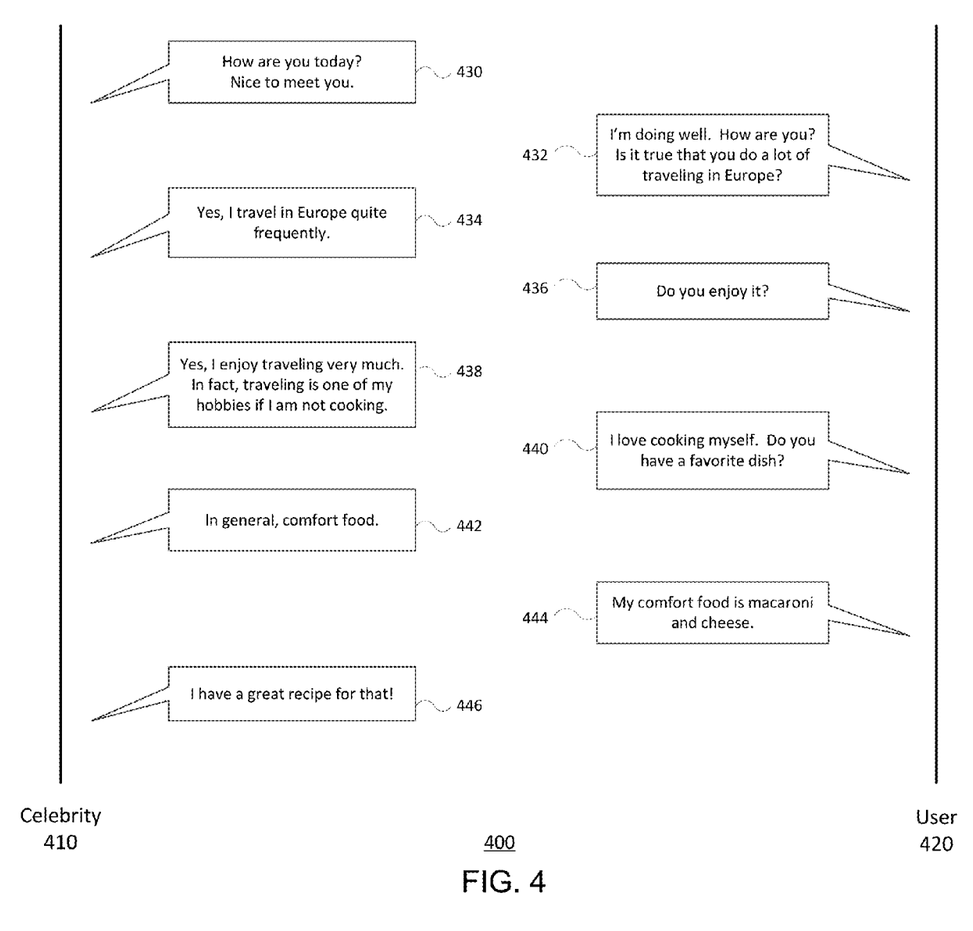
FIG. 4 is an example dialogue diagram in accordance with aspects of the disclosure.

FIG. 4 is an example dialogue diagram 400 between a celebrity 410 and a user 420 during an interactive session. In this example, the celebrity 410 may initiate the conversation with "How are you today? Nice to meet you," at block 410. Subsequently, the user may respond, "I'm doing well. How are you? Is it true that you do a lot of traveling in Europe?" at block 432 using a natural language speech input. At this point, the one or more processors of the computing device providing the interactive session with the celebrity receives and performs analysis on the user input. The analysis may be used to determine which output, e.g., video response, audio response, text response, is associated with the user input. For instance, a previously recorded video response of the celebrity 410 answering "Yes, I travel in Europe quite frequently," may be associated with the user input at block 432 and outputted to the user at block 434. In some instances, the celebrity's response associated with the user's question may be accompanied with a generalized question directed to the user in order to maintain a sense of conversation. Using the example above, the celebrity 410's response at block 434 may be "Yes, I travel in Europe quite frequently. How about yourself?"

The analysis of the user input may be based at least on the identification of particular keywords, or combinations of keywords, of the user input. By way of the example user input above, terms such as "traveling," "Europe," "how," and "you" may be the keywords used to identify the appropriate pre-recorded video response. The processor 112 of computing device 110, for instance, may identify "traveling" and "Europe" and match those keywords with a set of pre-recorded video responses, one of which is "Yes, I travel in Europe quite frequently." Other responses may be "I recently did some traveling in Italy and France," or "I love traveling in Europe." The analysis of the user input may also be based on identifying synonyms associated with particular key words. For example, the one or more processors may recognize that the term "frozen yogurt" and "ice cream" are synonymous terms. In that regard, both "frozen yogurt" and "ice cream" may be matched with the same pre-recorded video responses.

The analysis may further include associating a match score for each output in the selected set of outputs in order to determine which one is most appropriate to provide to the user. In one example, the match score may range from 0 to 10, 10 being a perfect match. As described above, the processor 112 of the computing device 110 may identify that "traveling" and "Europe" are the keywords in the user input and may include pre-recorded video responses of Fabio Viviani answering: (1) "Yes, I travel in Europe quite frequently," (2) "I recently did some traveling in Italy and France," and (3) "I love traveling in Europe," in the set of outputs. The first output may have a match score of 9 because it includes an affirmative answer, "yes," and references his frequency of travel in Europe. The second output may have a match score of 8 because it references his view about traveling in Europe. The third output may have a match score of 5 because it is a more generic answer about traveling in two European countries. In that regard, the computing device 110 may output the first pre-recorded video response.

The interaction between the celebrity 410 and the user 420 may be conversational, as if the participants were communicating with each other in person. For example, at block 436, the user 420 may continue his or her conversation with the celebrity 410 by asking "Do you enjoy it?" As discussed above, one or more words of the user input at block 432 may be associated with keywords. As an example, words such as "travelling" and "Europe" may be associated with pronouns like "it" and "that." Thus, "it" and "that" may be the keywords associated with "travelling" and "Europe." In that regard, when the user 420 refers to "it" at block 436, the one or more processors of the computing device may recognize that the user 420 is referring to "travelling" and subsequently complete the analysis of the user input. Then, the one or more processors may associate the response "Yes, I enjoy traveling very much. In fact, travelling is one of my hobbies if I am not cooking," at block 438.

At block 440, the user 420 may ask another question: "I love cooking myself. Do you have a favorite dish?" An associated response may be a video response of the celebrity 410 reciting, "In general, comfort food," at block 442. Subsequently, at block 444, the user 420 may respond, "My comfort food is macaroni and cheese." And at block 446, the computing device may output the celebrity 410 responding, "I have a great recipe for that!" In addition to the video response, a clickable link may also be provided to the user, such that the user may be able to access the recipe via a webpage on the Internet. Also, as shown, the user input may not always be a question. The computing device may nonetheless associate an output to a non-question input, such as the one at block 444.

Figure 5:
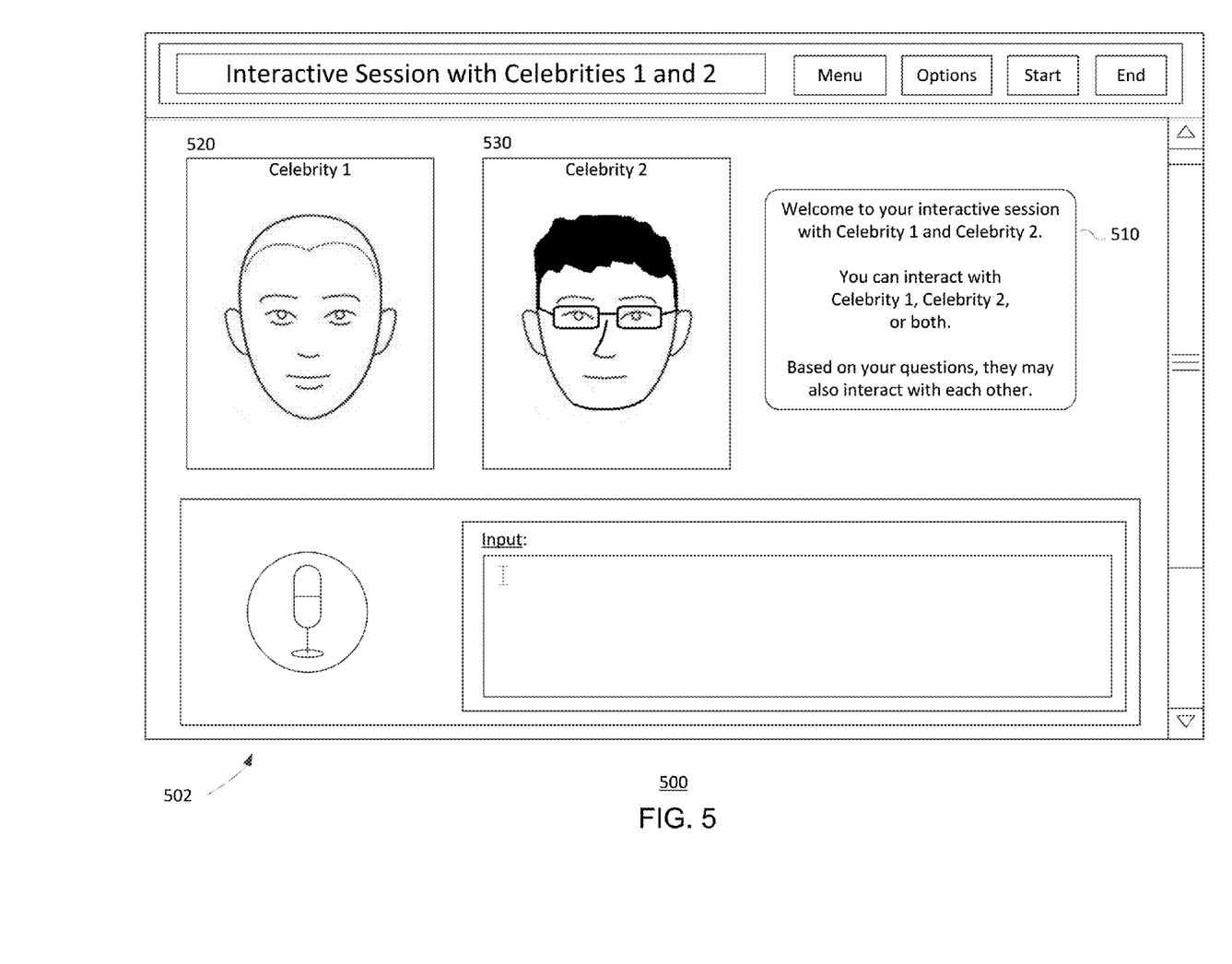
FIG. 5 is a further example screenshot of an interactive session involving two celebrities in accordance with aspects of the disclosure.

The interactive session may not be limited to just one celebrity. In an alternative example, a user may virtually interact with two or more celebrities via interactive interface 502. FIG. 5 is an example screenshot 500 of an interactive session interface with two different celebrities, celebrity 1 and celebrity 2. The interactive interface 502 may be configured in a similar manner to the interactive interface 202 depicted in FIG. 2. The visual representations of the celebrities may be rendered to the user in boxes 520 and 530, such that box 520 and box 530 are adjacent to one another. As depicted, the user may be greeted with a greeting box 510 informing the user that he or she can interact with celebrity 1, celebrity 2, or both at the same time. The greeting box 510 may also state that the celebrities may interact with each other based on the type of question the user's input.

Similar to the interactive interface 202, the user may be able to interact with celebrity 1 and celebrity 2 via natural language speech input or text input, or both. And similar to the interactive interface depicted in FIG. 3, the user may be provided selectable pre-formulated inputs. As will be further discussed below with respect to FIG. 6, the conversation may initially start with one celebrity. Subsequently, the user may involve the other celebrity into the conversation, or in other instances, the first celebrity may involve the second celebrity into the conversation.

Figure 6:
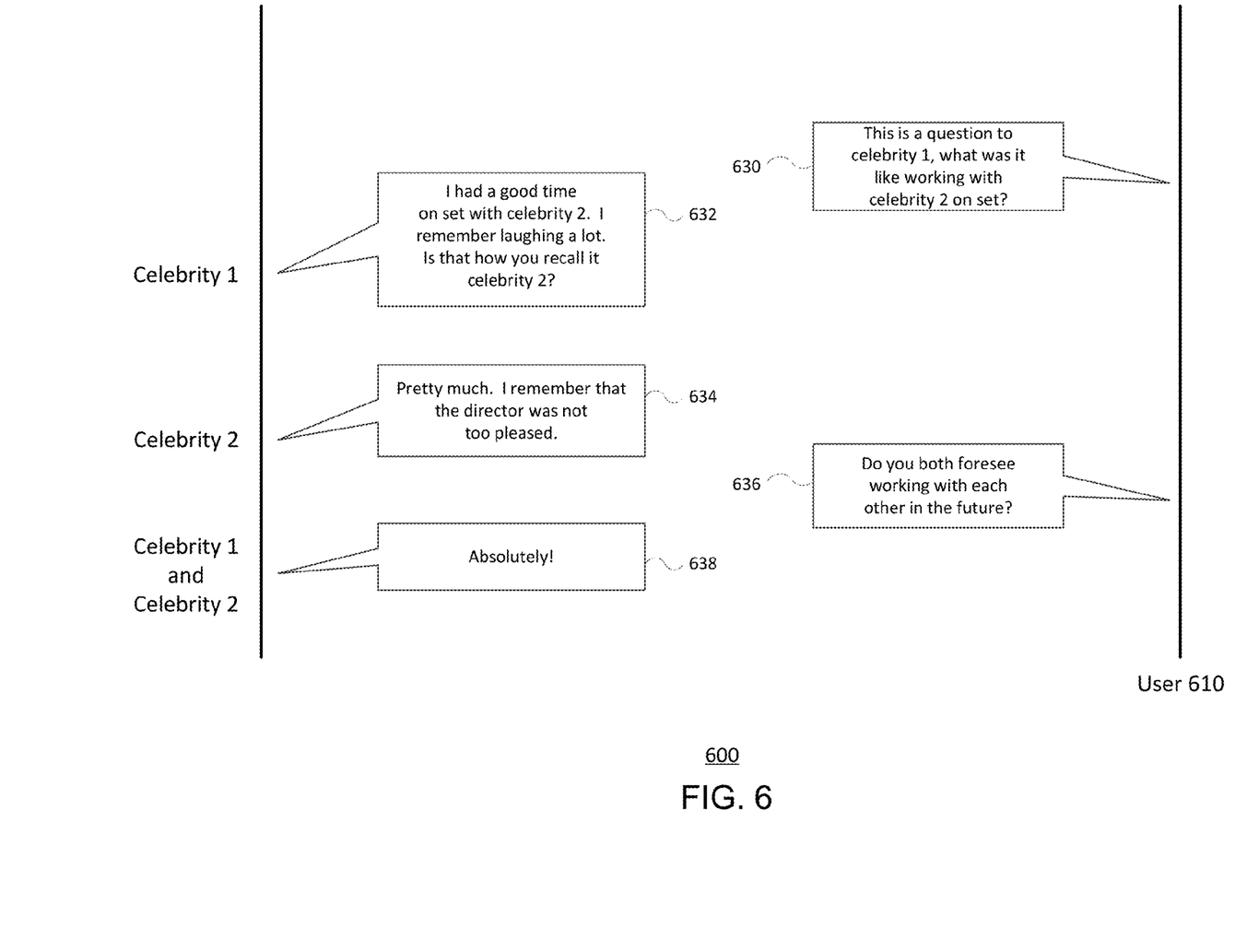
FIG. 6 is another example dialogue diagram in accordance with aspects of the present disclosure.

FIG. 6 is an example dialogue diagram 600 among two different celebrities and a user 610. In this example, celebrity 1 and celebrity 2 may be movie actors that have worked together on the same film. The user 610 may start off the conversation with a question to celebrity 1. The user may ask, "This is a question to celebrity 1, what is it like working with celebrity 2 on set?" at block 630. After performing analysis on the question, the one or more processors of the computing device may determine that the question is intended for celebrity 1. An output response may be associated with the user's question, such as "I had a good time on set with celebrity 2. I remember laughing a lot. Is that how you recall it celebrity 2?" at block 632.

At block 632, the celebrity 1 is now involving celebrity 2 into the conversation. The one or more processors may recognize the output of celebrity 1 as input for celebrity and determine an output response based on celebrity 1's question. The output response may be a previously recorded video of celebrity 2 answering "Pretty much. I remember that the director was not too pleased" at block 634. In turn, the user may use natural language speech input to ask both celebrity 1 and celebrity 2, "Do you both foresee working with each other in the future?" at block 636. Subsequently, both celebrity 1 and celebrity 2 may simultaneously respond "Absolutely!" at block 638.

While FIG. 6 depicts an example instance of celebrity 2 responding to celebrity 1 during an interactive session among the celebrities and the user, the interactive session may not be limited thereto. In another example interactive session, the user may ask a particular question directed to celebrity 1 (which may or may not be the question in block 630), and the one or more processors of the computing device may output a response associated with that question for celebrity 1. Thereafter, the user may ask the same question, or a different question, to celebrity 2, and the one or more processors of the computing device may also output a response associated with the question for celebrity 2. Subsequently, the user may then ask a different question to either celebrity 1 or celebrity 2. In this regard, the user may be able to interact with celebrity 1 and celebrity 2 in a manner such that there are no interruptions or breaks in between the user's questions and respective responses (e.g., side conversations between celebrity 1 and celebrity 2).

Figure 7:
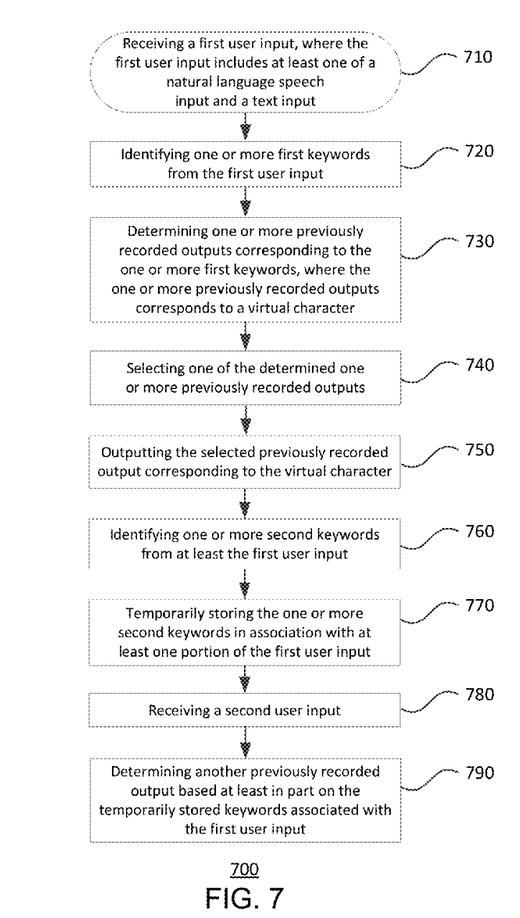
FIG. 7 is an example flow diagram in accordance with aspects of the disclosure.

FIG. 7 is an example flow diagram 700 of an interactive session between a celebrity and a user. By way of the example depicted in FIG. 4 only, a computing device receives a first user input, where the first user input includes at least one of a natural language speech input and a text input, at block 710. The user may ask a celebrity via natural language speech, "I love cooking. Do you have a favorite dish?" At block 720, the computing device may identify one or more first keywords from the first user input. In this instance, the keywords may be "favorite" and "dish." Thus, "favorite" and "dish" may be used to determine one or more previously recorded outputs (e.g., responses) corresponding to the one or more first keywords at block 730.

The one or more previously recorded outputs may correspond to a virtual character, such as a celebrity. As such, the previously recorded outputs corresponding to the keywords "favorite" and "dish" identified at block 720 may be "In general, comfort food," "I really like Italian food," and "Any spontaneous dish that I can whip up using ingredients that I find in my fridge at the time." At block 740, the computing device may select one of these previously recorded outputs. The selection may be based on a match score. As described above, the match score may range from 0 to 10, 10 being a perfect match. The match score may be based in part on the specificity of the response in relation to the question that was asked. In that regard, the last output, "Any spontaneous dish that I can whip up using ingredients that I find in my fridge at the time," may have the highest match score because the output specifically addresses the user's question in that the response refers to a dish (as opposed to general types of food, such as comfort food or Italian food).

At block 750, the computing device outputs the selected previously recorded output corresponding to the virtual character, e.g., the celebrity. Meanwhile, at block 760, the computing device identifies one or more second keywords from at least the first user input. The one or more second keywords may also be derived from the selected previously recorded output. The second keywords may be keywords associated with part of speech, such as a noun, a pronoun, an adjective, a verb, an adverb, a preposition, a conjunction, an interjection, etc. For example, one or more pronouns may be associated with certain nouns of the user input. Pronouns such as "it" or "that" may be associated with the noun "dish." Accordingly, the one or more second keywords may be temporarily stored in association with at least one portion of the user input, at block 770. In other words, the user may use "it" in a subsequent input and the computing device may determine that "it" refers to "dish." At block 780, the computing device may receive a second user input, and at block 790 determines another previously recorded output based at least in part on the temporarily stored keywords associated with the first user input.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for conducting an interactive session between a user and a plurality of virtual characters, comprising:

receiving over a network from a user device, using at least one processor, a first user input representing one or more questions or statements directed to one or more of the plurality of virtual characters, wherein each virtual character is a digital representation of a real person, wherein the first user input includes at least one of a natural language speech input and a text input;

identifying, using the at least one processor, one or more keywords from the first user input;

determining, using the at least one processor, to which of the plurality of virtual characters the first user input is directed;

accessing, using the at least one processor, a plurality of previously recorded outputs corresponding to the virtual character to which the first user input is determined to be directed, wherein each previously recorded output corresponds to a respective virtual character, and wherein each virtual character interacts with the user through the plurality of previously recorded outputs corresponding to that virtual character, and wherein each previously recorded output is a recording of the real person represented by the virtual character corresponding to that previously recorded output;
determining, using the at least one processor, which one or more of the accessed plurality of previously recorded outputs corresponding to the virtual character to which the first user input is directed further corresponds to at least one of the identified keywords;
selecting, using the at least one processor, one or more of the accessed previously recorded outputs that further corresponds to at least one of the identified keywords;
outputting, using the at least one processor, the selected one or more previously recorded outputs in response to the first user input;
automatically temporarily storing in a network coupled memory remote from the user device, using the at least one processor, at least one of the identified keywords of the first user input;
automatically storing, using the at least one processor, at least a portion of the first user input, such that the stored portion of the first user input can be flagged with a later recorded output of the virtual character that is added to the plurality of previously recorded outputs;
receiving, using the at least one processor, a second user input representing one or more questions or statements directed to one or more of the plurality of virtual characters, wherein the second user input is received after the one or more selected previously recorded outputs are outputted, and wherein both the first and second user inputs are received during the course of the interactive session;
determining, using the at least one processor, to which of the plurality of virtual characters the second user input is directed;
accessing, using the at least one processor, a plurality of previously recorded outputs corresponding to the virtual character to which the second user input is directed; and
selecting, using the at least one processor, one or more of the accessed plurality of previously recorded outputs corresponding to the virtual character to which the second user input is determined to be directed, based at least in part on the temporarily stored keywords from the first user input.

2. The method of claim 1, wherein the one or more previously recorded outputs includes at least one of a video response, an audio response, and a text response.

3. The method of claim 1, further comprising receiving, using the at least one processor, a request to interact with the plurality of virtual characters in the interactive session.

4. The method of claim 3, wherein the first user input is determined to be directed to a first virtual character, the method further comprising:
identifying, using the at least one processor, the selected previously recorded output corresponding to the first virtual character as a question or statement directed to a second virtual character of the plurality of virtual characters;
determining, using the at least one processor, a previously recorded output corresponding to the second virtual character to which the previously recorded output of the first virtual character is directed; and
outputting, using the at least one processor, the previously recorded output corresponding to the second virtual character in response to the previously recorded output of the first virtual character.

5. The method of claim 4, wherein the previously recorded output of the first virtual character and the previously recorded output of the second virtual character are outputted consecutively without additional user input.

6. The method of claim 1, wherein the selecting one of the determined one or more previously recorded outputs is based on a match score, further wherein the match score ranges from 0 to 10 and is based on at least a specificity level of the one or more previously recorded outputs relative to the user input.

7. The method of claim 1, wherein the identified keywords includes at least one of a noun, a pronoun, an adjective, a verb, an adverb, a preposition, a conjunction, and an interjection.

8. The method of claim 1, wherein the user input includes one or more pre-formulated inputs, such that the one or more pre-formulated inputs are selectable.

9. A system for conducting an interactive session between a user and a plurality of virtual characters, comprising:
a memory; and
at least one processor coupled to the memory, wherein the at least one processor is configured to:
receive over a network, from a user device that is remote from the memory, a first user input representing one or more questions or statements directed to one or more of the plurality of virtual characters, wherein each virtual character is a digital representation of a real person, and wherein the first user input includes at least one of a natural language speech input and a text input;
identify one or more keywords from the first user input;
determine to which of the plurality of virtual characters the first user input is directed;
access a plurality of previously recorded outputs corresponding to the virtual character to which the first user input is determined to be directed, wherein each previously recorded output corresponds to a respective virtual character, and wherein each virtual character interacts with the user through the plurality of previously recorded outputs corresponding to that virtual character, and wherein each previously recorded output is a recording of the real person represented by the virtual character corresponding to that previously recorded output;
determine which one or more of the accessed plurality of previously recorded outputs corresponding to the virtual character to which the first user input is directed further corresponds to at least one of the identified keywords;
select one or more of the accessed previously recorded outputs that further corresponds to at least one of the identified keywords;
output the one or more selected previously recorded outputs in response to the first user input;
automatically temporarily store in the memory at least one of the identified keywords in the memory;
automatically store at least a portion of the first user input, such that the stored portion of the first user input can be flagged with a later recorded output of the virtual character that is added to the plurality of previously recorded outputs;
receive a second user input representing one or more questions or statements directed to one or more of the plurality of virtual characters, wherein the second user input is received after the one or more selected previously recorded outputs are outputted, and wherein both the first and second user inputs are received during the course of the interactive session;

determine to which of the plurality of virtual characters the second user input is directed;
access a plurality of previously recorded outputs corresponding to the virtual character to which the second user input is directed; and
select one or more of the accessed plurality of previously recorded outputs corresponding to the virtual characters to which the second user input is determined to be directed, based at least in part on the temporarily stored keywords from the first user input.

10. The system of claim 9, wherein the one or more previously recorded outputs includes at least one of a video response, an audio response, and text response.

11. The system of claim 9, wherein the at least one processor is further configured to receive a request to interact with the plurality of virtual characters in the interactive session.

12. The system of claim 11, wherein the virtual character to which the first user input is determined to be directed is a first virtual character, and wherein the at least one processor is further configured to:
identify the selected previously recorded output corresponding to the first virtual character as a question or statement directed to a second virtual character of the plurality of virtual characters;
determine a previously recorded output corresponding to the second virtual character to which the previously recorded output of the first virtual character is directed; and
output the previously recorded output corresponding to the second virtual character in response to the previously recorded output of the first virtual character.

13. The system of claim 12, wherein the at least one processor is further configured to output the previously recorded output of the first virtual character and the previously recorded output of the second virtual character consecutively without additional user input.

14. The system of claim 9, wherein the selection of the one of the determined one or more previously recorded outputs is based on a match score, further wherein the match score ranges from 0 to 10 and is based on at least a specificity level of the one or more previously recorded outputs relative to the user input.

15. The system of claim 9, wherein the identified keywords includes at least one of a noun, a pronoun, an adjective, a verb, an adverb, a preposition, a conjunction, and an interjection.

16. The system of claim 9, wherein the user input includes one or more pre-formulated inputs, such that that the one or more pre-formulated inputs are selectable.

17. A non-transitory, tangible computer-readable medium on which instructions are stored, the instructions when executed by at least one processor performs a method for conducting an interactive session between a user and a plurality of virtual characters, comprising:
receiving over a network from a user device, using at least one processor, a first user input representing one or more questions or statements directed to one or more of the plurality of virtual characters, wherein each virtual character is a digital representation of a real person, and wherein the first user input includes at least one of a natural language speech input and a text input;
identifying, using the at least one processor, one or more keywords from the first user input;
determining, using the at least one processor, to which of the plurality of virtual characters the first user input is directed;
accessing, using the at least one processor, a plurality of previously recorded outputs corresponding to the virtual character to which the first user input is determined to be directed, wherein each previously recorded output corresponds to a respective virtual character, and wherein each virtual character interacts with the user through the plurality of previously recorded outputs corresponding to that virtual character, and wherein each previously recorded output is a recording of the real person represented by the virtual character corresponding to that previously recorded output;
determining, using the at least one processor, which one or more of the accessed plurality of previously recorded outputs corresponding to the virtual character to which the first user input is directed further corresponds to at least one of the identified keywords;
selecting, using the at least one processor, one or more of the accessed previously recorded outputs that further corresponds to at least one of the identified keywords;
outputting, using the at least one processor, the selected one or more previously recorded outputs in response to the first user input;
automatically temporarily storing in a network coupled memory remote from the user device, using the at least one processor, at least one of the identified keywords of the first user input;
automatically storing, using the at least one processor, at least a portion of the first user input, such that the stored portion of the first user input can be flagged with a later recorded output of the virtual character that is added to the plurality of previously recorded outputs;
receiving, using the at least one processor, a second user input representing one or more questions or statements directed to one or more of the plurality of virtual characters, wherein the second user input is received after the one or more selected previously recorded outputs are outputted, and wherein both the first and second user inputs are received during the course of the interactive session;
determining, using the at least one processor, to which of the plurality of virtual characters the second user input is directed;
accessing, using the at least one processor, a plurality of previously recorded outputs corresponding to the virtual character to which the second user input is directed; and
selecting, using the at least one processor, one or more of the accessed plurality of previously recorded outputs corresponding to the virtual character to which the second user input is determined to be directed, based at least in part on the temporarily stored keywords from the first user input.

18. The non-transitory, tangible computer-readable medium of claim 17, wherein the one or more previously recorded outputs includes at least one of a video response, an audio response, and a text response.

19. The non-transitory, tangible computer-readable medium of claim 17, the method further comprising receiving a request to interact with the plurality of virtual characters in the interactive session.

20. The non-transitory, tangible computer-readable medium tangible of claim 19, wherein the first user input is determined to be directed to a first virtual character, the method further comprising:

identifying the selected previously recorded output corresponding to the first virtual character as a question or statement directed to a second virtual character of the plurality of virtual characters;

determining a previously recorded output corresponding to the second virtual character to which the previously recorded output of the first virtual character is directed; and outputting the previously recorded output corresponding to the second virtual character in response to the previously recorded output of the first virtual character.

\* \* \* \* \*